US012627335B2

(12) United States Patent
Zhang et al.

(10) Patent No.: US 12,627,335 B2
(45) Date of Patent: May 12, 2026

(54) DIGITAL TWIN-BASED DEDUCTION AND OPTIMIZATION METHOD AND SYSTEM FOR INTELLIGENT REFLECTING SURFACE COMMUNICATION SYSTEM

(71) Applicant: SHAN DONG UNIVERSITY, Jinan (CN)

(72) Inventors: Haixia Zhang, Jinan (CN); Qiaojian Han, Jinan (CN); Dongfeng Yuan, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/779,125

(22) Filed: Jul. 22, 2024

(65) Prior Publication Data

US 2025/0175216 A1    May 29, 2025

(30) Foreign Application Priority Data

Nov. 28, 2023  (CN) .......................... 202311603354.0
Jan. 4, 2024  (CN) .......................... 202410012021.9

(51) Int. Cl.
*H04B 7/04*    (2017.01)
*H04B 17/309*    (2015.01)
*H04B 17/391*    (2015.01)

(52) U.S. Cl.
CPC ....... *H04B 7/04013* (2023.05); *H04B 17/346* (2023.05); *H04B 17/3913* (2015.01)

(58) Field of Classification Search
CPC .............. H04B 7/04013; H04B 17/346; H04B 17/3913
See application file for complete search history.

(56) References Cited

FOREIGN PATENT DOCUMENTS

WO      2023138797 A1    7/2023

*Primary Examiner* — Fred A Casca
(74) *Attorney, Agent, or Firm* — CBM PATENT CONSULTING, LLC

(57) ABSTRACT

Disclosed is a digital twin-based deduction and optimization method and system for an intelligent reflecting surface (IRS) communication system, including: collecting data from a scenario, including relevant data of an IRS physical model and real channel data; performing real-time data transmission on the collected data; establishing a digital twin three-dimensional (3D) model in a digital twin space based on the data after the real-time data transmission; establishing an IRS reflection mechanism model before fusing with the digital twin 3D model, the generalized Snell Equation being used to simplify a complex system in the IRS reflection mechanism model; deducing and optimizing the IRS communication system to obtain an optimization strategy; and feeding the optimization strategy back to the real world to realize the deduction and optimization of the IRS communication system.

7 Claims, 4 Drawing Sheets

The positions of data collectors or sensors is between the BS and UE or on the UAV in figure.

DIGITAL TWIN-BASED DEDUCTION AND OPTIMIZATION METHOD AND SYSTEM FOR INTELLIGENT REFLECTING SURFACE COMMUNICATION SYSTEM

CROSS-REFERENCE TO RELATED APPLICATIONS

This application claims priority to Chinese Patent Application Ser. Nos. CN2023116033540 and CN2024100120219 filed on Nov. 28, 2023 and Jan. 4, 2024, respectively.

FIELD OF THE INVENTION

The present disclosure relates to a digital twin-based deduction and optimization method and system for an intelligent reflecting surface (IRS) communication system in the technical field of digital twin.

BACKGROUND OF THE INVENTION

With the continuous progress of communication technology, effectively enhancing communication quality and coverage range has become a research hotspot. To cope with this challenge, digital twin, as a new generation of information technology, has begun to receive widespread attention. This technology maps things from the real world to the virtual world, thus providing a new perspective to understand and optimize various scenarios in reality.

In the field of communications, digital twin technology has great potential. By combining physical mechanism systems or artificial intelligence algorithms with digital twins, predictions can be made based on existing or historical data, to preview and optimize the communication environment before actual operation. Such a preview simulation contributes to optimizing system parameters and provides feedback on achieving an optimal communication effect in a specific environment.

IRS, as a hotspot of communication research in recent years, is particularly suitable for modeling and optimization using digital twins. The IRS consists of low-cost passive reflective elements capable of creating a direct line of sight (LOS) links and accurately delivering communication signals. This is particularly valuable in urban environments because buildings and other obstacles tend to hinder the propagation of signals. However, although the theoretical research of the IRS is deepening, its deployment in actual scenarios is still limited by high cost and high risk.

Current research mainly focuses on optimizing communication rates and balancing user communication resources. For example, Chinese patent document CN116667902A discloses "Active Intelligent Reflecting Surface Auxiliary Communication System Mode Selection Method", and Chinese patent document CN116648861A discloses "System and Method for Using Intelligent Reflecting Surface in Communication System". Meanwhile, some related technologies have applied 5G network slice and digital twin management terminals. However, there are still some problems and disadvantages with this system. First, the concept of server digital twins is marginalized. For example, Chinese patent document CN114650545A discloses "Beam Parameter Determination Method and Apparatus, and Network Device", including generating the IRS digital twin of a first IRS panel; and obtaining beam parameters from a network device to the IRS panel and/or form the IRS panel to a terminal according to the digital twin. Chinese patent document CN114928893A discloses "Architecture and Task Unloading Method Based on Intelligent Reflecting Surface", in which the concept of digital twin optimization is applied. However, the concept of digital twins in the existing patents is not clear enough, and there is no complete step to construct a digital twin system.

However, few studies have focused on the specific deployment of IRS in real environments, especially the lack of geometric features of electromagnetic wave reflection caused by the metamaterial abnormal reflection mechanism of IRS. This leads to a certain gap between theoretical research and actual deployment.

SUMMARY OF THE INVENTION

Given the shortcomings of the prior art, the present disclosure constructs an IRS-oriented three-dimensional (3D) digital twin system and proposes a full-flow mechanism-level preview method. Through the method, the full-flow and full-dimensional preview of the communication process may be realized, and the IRS user optimization method based on swarm intelligence algorithm or deep reinforcement learning (DRL) is established. To ensure real-time information transmission between the virtual and real space, the system further integrates real-time communication technology. In conclusion, combined with the application of digital twin technology and IRS in communication, it provides a new, efficient, and practical optimization framework for future communication systems.

Explanation of Terms:

1. Deep Q-Network (DQN) is an algorithm that combines deep learning (DL) and reinforcement learning (RL). It uses a depth neural network to approximate a Q function that estimates the expected return to perform some action in a given state. By combining the expressive learning ability of DL and the decision-making ability of Q-learning, DQN achieves effective learning in a complex environment.

2. Proximal strategy optimization (PPO) is a method for training RL algorithms, especially in the family of strategy gradients. It aims to solve some stability and efficiency problems in the process of strategy updating, by limiting the step size of strategy updating to avoid a sharp decline in performance and to achieve a balance between exploration and utilization.

3. Asynchronous advantage actor-critic (A3C) is a RL algorithm, which combines Actor-Critic architecture and asynchronous method. In A3C, a plurality of Agents is executed in parallel in different environment instances, collecting data and independently updating the global model. This method can speed up the learning process while reducing dependence on data dependencies.

4. DRL is a method combining DL and RL. It uses deep neural networks (DNNs) to process high-dimensional input data to learn strategies and cost functions in complex and high-dimensional environments. DRL has been used in a variety of fields such as games, robot control, and natural language processing.

5. Genetic algorithm (GA) is an optimization technology to imitate biological evolution process. It optimizes problem solutions by modeling natural selection and genetic mechanisms such as crossover and mutation. GA is often used to solve search and optimization problems, especially when the solution space is large and complex.

6. Particle swarm optimization (PSO) is a population-based optimization technology inspired by the behavior of birds and fish. It finds the optimal solution by simulating the process of a group of particles moving in the solution space and searching for the optimal solution. PSO is simple and effective, which is suitable for various continuous optimization problems.

7. Ant colony optimization (ACO) is an optimization algorithm that imitates ant foraging behavior. It is a population-based search method for finding optimal paths or solving graph theory problems. In ACO, ants move on a graph structure and communicate indirectly by releasing and perceiving pheromones, thereby finding an optimal solution among a plurality of ants in coordination.

The technical solution of the present disclosure is as follows:

A digital twin-based deduction and optimization method for an IRS communication system comprising a non-transitory computer readable medium operable on a computer with memory for the digital twin-based deduction and optimization method, and comprising program instructions for executing the following steps of:

collecting data from a scenario, including relevant data of an IRS physical model and real channel data;

performing real-time data transmission on the collected data;

establishing a digital twin 3D model in a digital twin space based on the data after the real-time data transmission;

establishing an IRS reflection mechanism model before fusing with the digital twin 3D model, the generalized Snell Equation being used to simplify a complex system in the IRS reflection mechanism model;

deducing and optimizing the IRS communication system to obtain an optimization strategy; and feeding the optimization strategy back to the real world to realize the deduction and optimization of the IRS communication system.

Preferably according to the present disclosure, the relevant data of the IRS physical model and the real channel data include electromagnetic waves; angles of the electromagnetic waves; a relative distance and position between a base station (BS), the IRS, and user equipment (UE); temperature and humidity; actual communication traffic or dynamic changes of the UE; phase and frequency changes of electromagnetic waves reflected by the IRS; energy or power of the electromagnetic waves transmitted by the BS and reflected by the IRS; an operating state of the IRS; ambient noise; delay, bandwidth, and data transmission rate of actual network communication; 3D appearance images; and 3D point cloud data.

Preferably according to the present disclosure, the relevant data of the IRS physical model and the real channel data are acquired through various sensors, various sensors including an electromagnetic wave sensor, an angle sensor, a distance/position sensor, a temperature and humidity sensor, a dynamic load sensor, a phase and frequency sensor, an energy or power sensor, a state monitoring sensor, an ambient noise sensor, a network communication quality sensor, an image data sensor, and a point cloud data sensor, where the electromagnetic wave sensor is configured to capture the electromagnetic waves transmitted from the BS and the electromagnetic waves reflected by the IRS; the angle sensor is configured to measuring an angle of the electromagnetic wave incident on the IRS and an exit angle of the electromagnetic wave after reflection in real-time; the distance/position sensor is configured to measure the relative distance and position between the BS, the IRS, and the UE; the temperature and humidity sensor is configured to measure temperature and humidity; the dynamic load sensor is configured to monitor the actual communication traffic or the dynamic change of the UE; the phase and frequency sensor is configured to monitor phase and frequency changes of the electromagnetic waves reflected by the IRS; the energy or power sensor is configured to monitor the energy or power of the electromagnetic waves transmitted by the BS and reflected by the IRS; the state monitoring sensor is configured to monitor the operating state of the IRS; the ambient noise sensor is configured to capture ambient noise or interference; the network communication quality sensor is configured to monitor the delay, bandwidth, and data transmission rate of the actual network communication; the image data sensor is configured to collect 3D appearance image and match accurate positioning; and the point cloud data sensor is configured to collect 3D point cloud data.

Preferably according to the present disclosure, the relevant data of the IRS physical model and the real channel data are acquired through a real-time communication mode; the real-time communication mode includes mobile communication, satellite communication, a wireless local area network, wired communication, and Bluetooth; the real-time data transmission is performed through communication protocols including but not limited to Socket, HTTP/HTTPS, file transfer protocol (FTP), simple mail transfer protocol (SMTP), message queuing telemetry transport (MQTT), constrained application protocol (CoAP), extensible messaging and presence protocol (XMPP), WebSockets, google remote procedure call (gRPC), RESTful application programming interfaces (APIs), advanced message queuing protocol (AMQP), streaming text orientated messaging protocol (STOMP), real-time transport protocol (RTP), transmission control protocol (TCP), user datagram protocol (UDP), Bluetooth, Bluetooth low energy (BLE), Zigbee, Z-Wave, low-rank adaptation (LoRa), near field communication (NFC), Modbus, Profibus, simple object access protocol (SOAP), and data distribution service (DDS).

Preferably according to the present disclosure, the establishing a digital twin 3D model in a digital twin space based on the data after the real-time data transmission is divided into static content modeling and dynamic content modeling, including:

performing static content modeling on background information with little change, while performing dynamic content modeling on user information with great change, modeling steps being as follows:

data cleaning: processing sensor data, namely, the acquired relevant data of the IRS physical model and real channel data;

3D modeling: creating geometry and appearance of the digital twin 3D model;

attribute assignment: assigning physical, chemical, or other relevant attributes to the digital twin 3D model; and model verification: comparing with real equipment or environment to ensure accuracy.

Preferably according to the present disclosure, establishing an IRS reflection mechanism model before fusing with the digital twin 3D model includes:

(1) Establishment of the IRS Reflection Mechanism Model defining characteristics of IRS units;

simulating electromagnetic wave propagation;

optimization of algorithm design: dynamically adjusting reflection characteristics of the IRS units to optimize a signal path; and integration of environmental factors: integrating the environmental factors into the IRS reflection mechanism model;

(2) Establishment of the Digital Twin 3D Model creating a digital twin 3D model of the physical world;

integrating sensor data;

simulation and analysis: running simulations in the digital twin 3D model to analyze the performance of the IRS and its impact on signal coverage;

(3) Fusion of the IRS Reflection Mechanism Model and the Digital Twin 3D Model integrating the IRS reflection mechanism model into the digital twin 3D model;

dynamic data exchange: ensuring real-time data exchange between the IRS reflection mechanism model and the digital twin 3D model;

visualization and analysis: analyzing and demonstrating influences of the IRS and communication performance under different conditions using visualization tools of the digital twin 3D model; and real-time updates and iterations: updating the digital twin 3D model in real-time according to real-world changes and IRS performance data, to keep the digital twin 3D model up-to-date and accurate.

Preferably according to the present disclosure, the generalized Snell Equation being used to simplify a complex system in the IRS reflection mechanism model includes:

(1) transmitting a signal from the BS, that is, transmitting a plurality of beams of light, where initialization parameters include radial widths of the beams of light, a position of the BS in a 3D geometric space, and the rotation amount of the BS in a 3D space, and specifically includes directions of the transmitted electromagnetic waves, central position of the IRS, the rotation amount of the IRS in the 3D space, the side lengths, thicknesses, and number of the IRS units, an overall size of an IRS plane, relative position of the IRS units and position thereof in space;

(2) solving a normal line of the IRS plane;

(3) performing ray detection on the transmitted electromagnetic waves to determine whether the IRS is within the range;

detecting if the ray intersects the plane, as shown in Formula (1):

$$t = (P_0 - L_0) \cdot \frac{N}{L \cdot N},$$ (1)

where in Formula (1), $P_0$ is a point on the surface of an object to be detected, $L_0$ is a starting point of the ray, L is the direction of the ray, N is a normal line to the surface of the object, and "•" represents a dot product, t is a scalar, if t is less than 0 or greater than 1, then the ray does not intersect the surface of the object; if t is between 0 and 1, then the ray intersects the surface of the object;

calculating an intersection point P by Formula (2):

$$P = L_0 + t * L,$$ (2)

(4) determining whether the ray is within the range of a plate, namely, whether a coverage range of the ray overlaps with a boundary of the plate;

calculating the position of a collision point relative to the IRS plate;

(5) finding an index of an IRS unit where a light beam passes through reflection, and acquiring a phase parameter of the index;

(6) using the generalized Snell Equation to calculate abnormal reflection to obtain angles of reflection ray $\theta_t$ and $\theta_i$, as shown in Formulas (3) and (4):

$$\sin(\theta_t)n_t - \sin(\theta_i)n_i = \frac{\lambda_0}{2\pi}\frac{d\Phi}{dx},$$ (3)

$$\theta_i = \arcsin\left(\sin(\theta_t) - \frac{\lambda_0}{2\pi n_i}\left|\frac{d\Phi}{dx}\right|\right),$$ (4)

where in Formulas (3) and (4), $\theta_t$ is an incident angle, $n_t$ is an incident spatial dielectric constant, $\theta_i$ is a reflection angle, $n_i$ is a reflection spatial dielectric constant, $\lambda_o$ is a wavelength, $d\Phi$ is phase mutation, and dx is reflection displacement difference caused by mutation; and (7) solving a reflection ray path and setting a ray detection interface according to the angles and the collision point.

Preferably according to the present disclosure, the deducing and optimizing the IRS communication system includes:

a channel model being represented by a receiving end signal $y_k$ as shown in Formula (5) in the transmission process of a channel:

$$y_k = \left(h_{r,k}^H \Theta G + h_{d,k}^H\right)\sum_{j=1}^{K} w_j s_j + n_k,$$ (5)

where in Formula (5), $$k = 1, \dots, K, h_{r,k}^H$$

is an incident channel, $\Theta$ is a matrix composed of IRS phase parameters, G is a reflection channel, $$h_{d,k}^H$$

is a direct channel, H is a conjugate transpose of a matrix operation, d is a direct distance between transmitter and receiver, $w_j$ is a $j^{th}$ beamforming parameter of a transmitting end, $s_j$ is a $j^{th}$ transmitting signal, K is the number of antennas at the transmitting end, and $n_k$ is noise; therefore, Formula (6) is obtained by a channel capacity Formula:

$$SINR_k = \frac{\left|\left(h_{r,k}^H \Theta G + h_{d,k}^H\right)w_k\right|^2}{\sum_{j\neq k}^{K}\left|\left(h_{r,k}^H \Theta G + h_{d,k}^H\right)w_j\right|^2 + \sigma_k^2}, \forall\, k, \quad (6)$$

where $SINR_k$ is a signal to interference plus noise ratio, $$\sigma_k^2$$

is a variance of the noise, $w_k$ is a power parameter of beamforming;

maximizing the minimum $SINR_k$, that is, max{min ($SINR_k$)}, making resource allocation of the IRS communication system reach Pareto optimality.

Preferably according to the present disclosure, the deducing and optimizing the IRS communication system is realized using deep reinforcement learning (DRL), including:

(a) definition of environment and state:

environment being a problem that is trying to optimize, that is, max{min($SINR_k$)};

state being a current configuration of a matrix $\Theta$;

(b) definition of action space:

the action being to modify certain elements in the matrix $\Theta$ to generate a new matrix configuration;

defining a reward function: a reward function is defined as Formula (7):

$$Reward = \min(SINR_k); \quad (7)$$

(c) selection of a DRL algorithm;

(d) training of a model: training the model using the selected DRL algorithm to learn what actions to take in each state to maximize rewards;

(e) strategy execution: using the model to determine an optimal action to take for a given matrix $\Theta$ after the training is complete;

(f) evaluation and adjustment: using test data to evaluate performance of the optimization strategy and adjust as needed.

Preferably according to the present disclosure, the deducing and optimizing the IRS communication system is realized using a swarm intelligence algorithm, including:

(g) encoding of solutions: encoding a matrix $\Theta$ to contain an array or list of all the elements;

(h) definition of a fitness function: the fitness function y being defined as Formula (8):

$$y = \min(SINR_k) \quad (8)$$

trying to find solutions to maximize the fitness function, including:

initializing population:

randomly generating a set of initial $\Theta$;

evaluation of initial population:

using the fitness function y to evaluate the quality of each solution;

iterative optimization:

for each iteration, updating the solution according to the selected swarm intelligence algorithm, including crossover, mutation, and/or selection of the solutions;

termination conditions: continuing the iteration until the termination condition is satisfied; and return to an optimal solution: returning to a solution with an optimal fitness value.

Preferably according to the present disclosure, the optimization strategy is fed back to the real world through a real-time communication mode.

A digital twin-based deduction and optimization system for an IRS communication system includes:

a data collection module, configured to collect data from a scenario, including relevant data of an IRS physical model and real channel data;

a data transmission module, configured to perform real-time data transmission on the collected data and feed an optimization strategy back to the real world to realize the deduction and optimization of the IRS communication system;

a digital twin 3D model establishment module, configured to establish a digital twin 3D model in a digital twin space based on the data after the real-time data transmission;

an IRS reflection mechanism model establishment module, configured to establish an IRS reflection mechanism model before fusing with the digital twin 3D model, the generalized Snell Equation being used to simplify a complex system in the IRS reflection mechanism model; and a deduction-optimization module, configured to deduce and optimize the IRS communication system to obtain an optimization strategy.

The beneficial effects of the present disclosure are as follows:

1. High integration and real-time feedback: The present disclosure perfectly combines the digital twin technology with the IRS device, enabling a high degree of mapping and real-time feedback between the real and virtual space. This integration provides an effective means for real-time simulation and prediction of communication environments, allowing for in-depth research and optimization before the actual deployment and operation of the IRS.

2. Accurate electromagnetic wave simulation: By introducing the generalized Snell Equation, the present disclosure can accurately simulate the abnormal reflection mechanism of electromagnetic waves by IRS materials and simplify a large number of numerical calculations in finite element analysis and numerical simulation of electromagnetic waves, thus providing theoretical support for the accurate transmission of communication signals. This simulation provides strong scientific guidance for the actual deployment of the IRS.

3. Deep 3D scenario preview: The present disclosure specifically builds a 3D digital twin system for IRS wireless communication scenarios so that the communication process can be simulated and previewed in full flow and full dimension. This in-depth 3D simulation allows for careful consideration and optimization of various factors that may affect the effectiveness of the communication.

4. Fast response and intelligent optimization: The integrated socket communication technology of the present disclosure ensures fast information feedback during the simulation and actual deployment to achieve fast response. At the same time, the introduced particle swarm algorithm-based optimization technology can find the optimal IRS configuration in a large range, further improving the communication effect.

5. Cost reduction and risk of actual deployment: Through the preview and optimization of the digital twin, the present disclosure can predict and avoid various possible problems and risks before actual deployment, thereby reducing the cost and risk of deployment and ensuring the stability and efficiency of a communication system.

6. Promotion of technical innovation in the field of communications: The present disclosure not only solves the actual technical problems in current IRS-driven wireless communications but also brings new research ideas and technical methods for the whole field of communications, with the potential to promote technical progress in the industry.

DETAILED DESCRIPTION OF THE EMBODIMENTS

The present disclosure is further defined in combination with the drawings and embodiments in the specification but is not limited to this.

Embodiment 1

Figure 1:
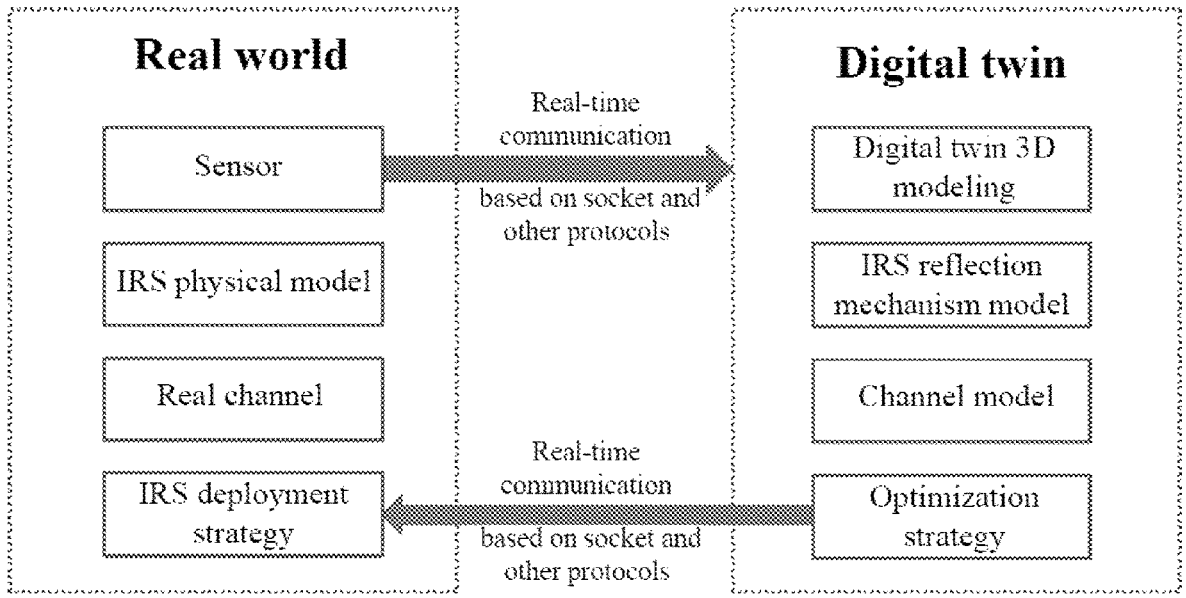
FIG. 1 is a block flow diagram of a digital twin-based deduction and optimization method for an IRS communication system of the present disclosure.
Figure 2:
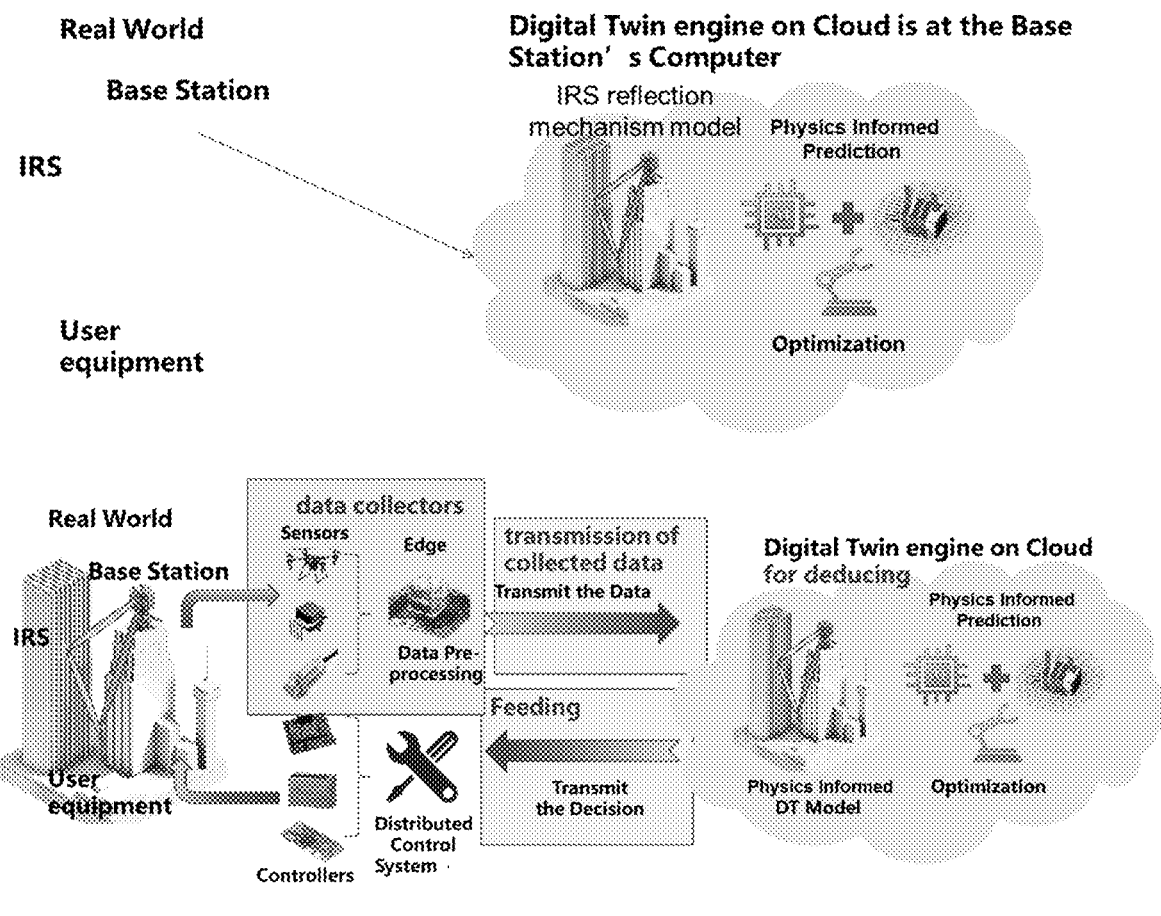
FIG. 2 shows structural details: 1—Unmanned Aerial Vehicle, 2—Infrared sensor, 3—Electromagnetic sensor, 4—Wave sensor, 5—Distance sensor, 6—Temperature sensor, 7—Dynamic load sensor, 8—Power sensor, 9—Static monitoring sensor, 10—Noise sensor, 11—Communication quality sensor, 12—Image data sensor, 13—Cloud sensor, 14—Processing sensor, and 15—3D Modeling sensor.
Figure 2:
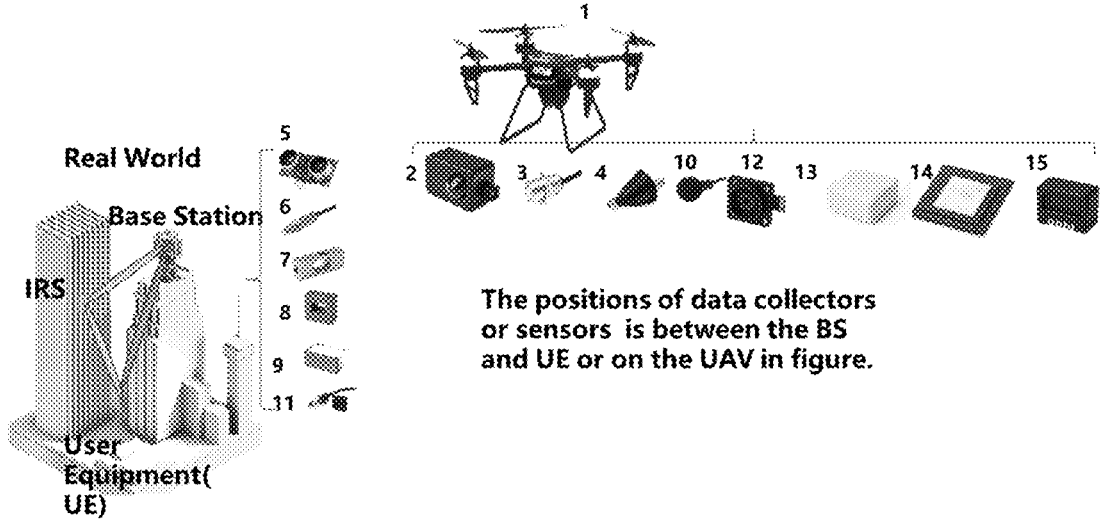
Figure 3:
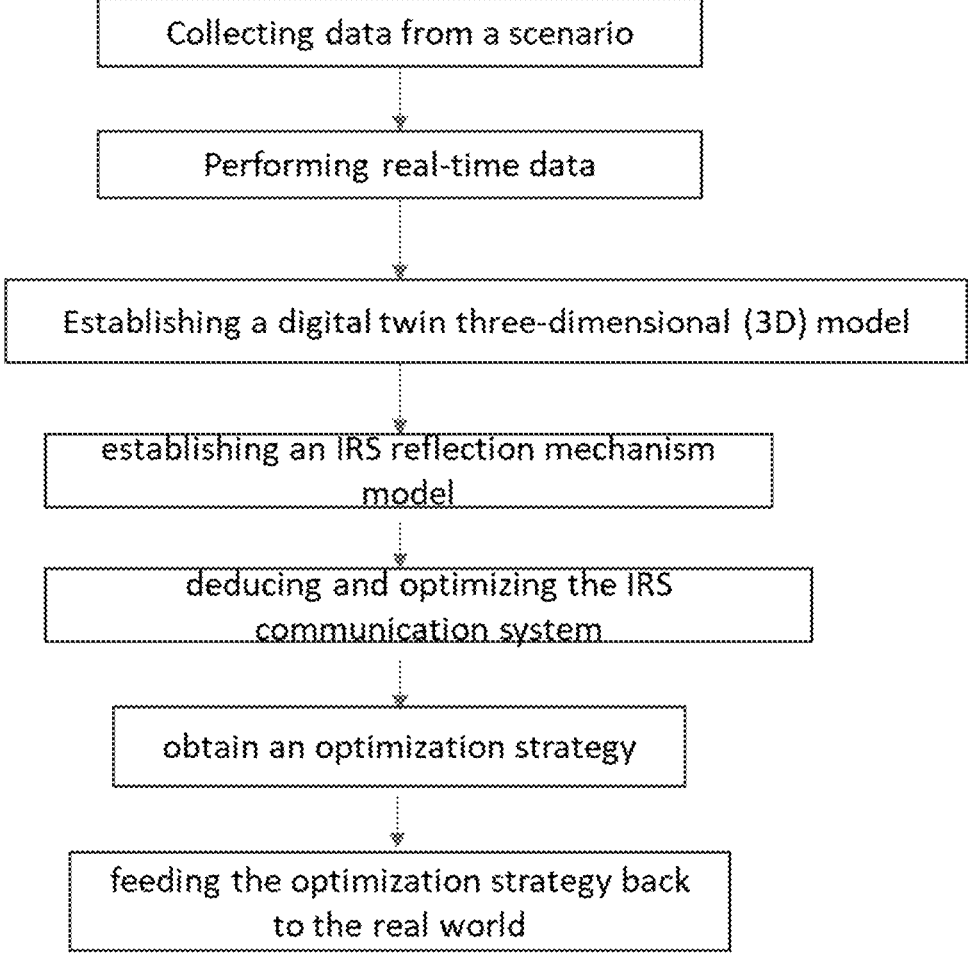
FIG. 3 is a flowchart of the digital twin-based deduction and optimization method.
Figure 4:
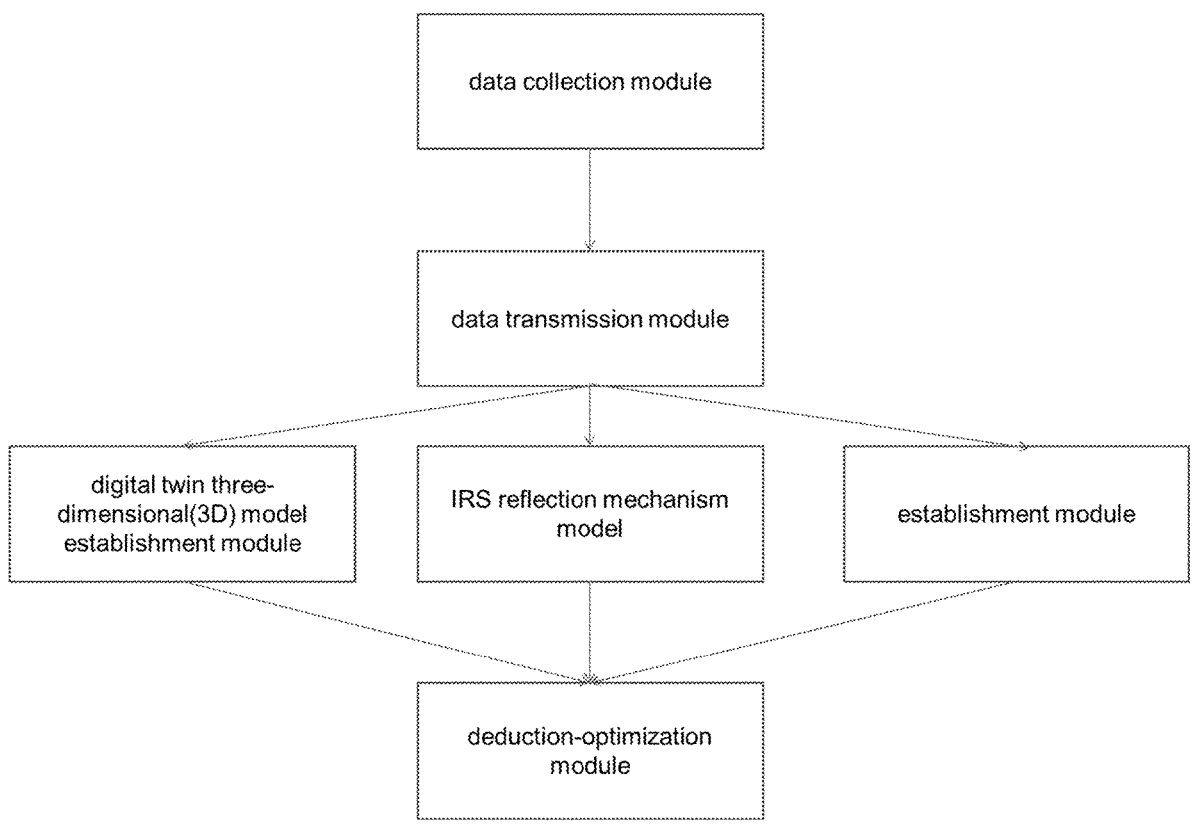
FIG. 4 is a flowchart of a digital twin-based deduction and optimization system for an intelligent reflecting surface (IRS) communication system.

A digital twin-based deduction and optimization method for an IRS communication system, as shown in FIG. 1, comprises a non-transitory computer readable medium operable on a computer with memory for the digital twin-based deduction and optimization method, and comprising program instructions for executing the following steps of:

deploying enough sensors in a real scenario, and collecting enough data from the scenario, including relevant data of an IRS physical model and real channel data;

performing real-time data transmission on the collected data;

establishing a digital twin 3D model in a digital twin space based on the data after the real-time data transmission;

establishing an IRS reflection mechanism model before fusing it with the digital twin 3D model, the generalized Snell Equation being used to simplify a complex system in the IRS reflection mechanism model;

deducing and optimizing the IRS communication system to obtain an optimization strategy; and feeding the optimization strategy back to the real world to realize the deduction and optimization of the IRS communication system.

The IRS communication system includes a BS, an IRS, and a UE.

The BS is a central node in a conventional wireless communication network that is responsible for transmitting and receiving wireless signals. The BS may be equipped with a high-performance antenna array for efficient signal processing and beamforming.

The IRS is a panel consisting of a large number of passive reflective elements, each of which can independently control the reflected phase of an incident wave. The IRS does not require a radio frequency front-end (RFFE) because it does not transmit a signal but only modifies the signal passing through its surface. The goal of the IRS is to optimize signal coverage by changing the propagation path of the signal, especially if the direct path is blocked.

The UE, such as a smartphone or other wireless terminal, is the receiving end of the communication system. The UE receives the signal reflected by the IRS.

The connection relationship and communication process are as follows:

Signal propagation: The BS transmits wireless signals that may reach the UE directly or may not reach directly because of obstacles.

Signal reflection: When the direct path is blocked, the signal transmitted by the BS is directed to the IRS. IRS intelligently adjusts the reflection phase of each cell on its surface so that the reflected signal optimally reaches the UE.

Signal reception: The UE receives a direct signal from the BS and/or a signal reflected by the IRS. This method can significantly improve signal quality, especially where conventional direct paths are not feasible.

Embodiment 2

A digital twin-based deduction and optimization method for an IRS communication system according to embodiment 1 is provided, the difference being as follows:

The relevant data of the IRS physical model and the real channel data include: electromagnetic waves; angles of the electromagnetic waves; a relative distance and position between a BS, the IRS, and a UE; temperature and humidity; actual communication traffic or dynamic changes of the UE; phase and frequency changes of electromagnetic waves reflected by the IRS; energy or power of the electromagnetic waves transmitted by the BS and reflected by the IRS; an operating state of the IRS; ambient noise; delay, bandwidth, and data transmission rate of actual network communication; 3D appearance images; and 3D point cloud data.

The relevant data of the IRS physical model and the real channel data are acquired through various sensors.

Various sensors include an electromagnetic wave sensor, an angle sensor, a distance/position sensor, a temperature and humidity sensor, a dynamic load sensor, a phase and frequency sensor, an energy or power sensor, a state monitoring sensor, an ambient noise sensor, a network communication quality sensor, an image data sensor, and a point cloud data sensor.

The electromagnetic wave sensor is configured to capture the electromagnetic waves transmitted from the BS and the electromagnetic waves reflected by the IRS, to ensure that the digital twin system can accurately simulate electromagnetic wave propagation in the actual communication environment.

The angle sensor is configured to measure an angle of the electromagnetic wave incident on the IRS and an exit angle of the electromagnetic wave after reflection in real time, considering the application of the generalized Snell Equation.

The distance/position sensor is configured to measure the relative distance and position between the BS, the IRS, and the UE, helping to optimize the deployment location and angle of the IRS.

The temperature and humidity sensor is configured to measure temperature and humidity; environmental factors, such as temperature and humidity, may affect the propagation characteristics of electromagnetic waves. These sensors can provide information about the current environmental conditions for the digital twin system to perform simulations and previews more accurately.

The dynamic load sensor is configured to monitor the actual communication traffic or the dynamic change of the UE, to better simulate and predict the response of the system.

The phase and frequency sensor is configured to monitor phase and frequency changes of the electromagnetic waves reflected by the IRS, which is critical to ensure the quality of the communication signal.

The energy or power sensor is configured to monitor the energy or power of the electromagnetic waves transmitted by the BS and reflected by the IRS, to evaluate the communication effect and make necessary adjustments.

The state monitoring sensor is configured to monitor the operating state of the IRS, including the health of its surface, the state of the reflective element, to simulate and predict its performance in the digital twin system.

The ambient noise sensor is configured to capture ambient noise or interference that may affect the communication quality.

The network communication quality sensor is configured to monitor the delay, bandwidth, and data transmission rate of the actual network communication, providing the actual communication quality data for the digital twin system.

The image data sensor is configured to collect 3D appearance images and match accurate positioning; unmanned aerial vehicle (UAV)-assisted collection is required for this process.

The point cloud data sensor is configured to collect 3D point cloud data, to finely construct 3D models, which requires the use of UAV-assisted collection.

The relevant data of the IRS physical model and the real channel data are acquired through a real-time communication mode; the real-time communication mode includes mobile communication, satellite communication, a wireless local area network, wired communication, and Bluetooth; the real-time data transmission is performed through communication protocols including but not limited to Socket, HTTP/HTTPS, FTP, SMTP, MQTT, CoAP, XMPP, WebSockets, gRPC, RESTful APIs, AMQP, STOMP, RTP, TCP, UDP, Bluetooth, BLE, Zigbee, Z-Wave, LoRa, NFC, Modbus, Profibus, SOAP, and DDS.

The establishing a digital twin 3D model in a digital twin space based on the data after the real-time data transmission is divided into static content modeling and dynamic content modeling, including:

The background information with little change is subjected to static content modeling using software including but not limited to Autodesk computer-aided design (AutoCAD), SolidWorks, 3D Studio Max (3DS MAX), MAYA, Rhino, and Revit, to save computing resources; the user information with great change is subjected to dynamic content modeling through MVSNet, NeRF, and other algorithms, using integrated software including but not limited to Agisoft Metashape, Meshroom, 3DF Zephyr, COLMAP, multi-view environment (MVE), Autodesk ReCap, and multi-view stereo (MVS), such as Regard 3D, visual structure from motion (VisualSFM), and Pix 4D. The modeling steps are as follows:

data cleaning: processing sensor data, namely, the acquired relevant data of the IRS physical model and real channel data;

3D modeling: creating geometry and appearance of the digital twin 3D model;

attribute assignment: assigning physical, chemical, or other relevant attributes to the digital twin 3D model; and model verification: comparing with real equipment or environment to ensure accuracy.

The specific implementation process for establishing a digital twin 3D model is as follows:

1. Data Collection

Sensor deployment: The sensors are deployed in an actual environment to collect data related to the IRS. These sensors may include wireless signal strength detectors, environmental monitoring devices, and the like.

Channel data collection: Channel data is collected by wireless signal measurement tools, including signal fading, multipath effects, noise, and other information.

2. Data Preprocessing

Noise filtering and data cleaning: Signal processing technology is used to remove noise and interference from the data, such as filters or statistical methods.

Data synchronization ensures that data acquired from different sensors is synchronized in time, which is essential for subsequent analysis.

3. Data Analysis

Feature extraction: Key features such as signal strength, propagation delay, and environmental variables are extracted from the raw data.

Data modeling: The data is analyzed using statistical or machine learning (ML) methods to establish a mathematical model of the channel characteristics.

4. Establishment of IRS Physical Model

Reflection characteristics modeling: Based on the collected data, the reflection characteristic model of the IRS unit is established, including the changes in reflection phase and amplitude.

Signal propagation simulation: The propagation path of the signal in the presence of IRS is simulated using the electromagnetic wave theory and the collected data.

5. Model Calibration and Verification

Model calibration: The model is calibrated using actual measurement data to ensure that the model reflects the characteristics of the real environment.

Comparison between simulation and experiment: The accuracy and reliability of the model are verified by comparing the predicted results with the actual measured data.

6. Iterative Optimization

Model optimization: Based on the data analysis and calibration results, the IRS model is optimized to improve its performance in practical applications.

Dynamic update: The model is continuously updated with continuously collected data to accommodate environmental changes and system evolution.

The establishing an IRS reflection mechanism model before fusing with the digital twin 3D model includes:

(1) Establishment of the IRS Reflection Mechanism Model

Definition of characteristics of IRS units: The electromagnetic characteristics of each IRS unit, such as reflection phase and amplitude, need to be precisely defined. This typically involves electromagnetic simulations and physical experiments.

Simulation of electromagnetic wave propagation: Electromagnetic wave propagation is used to simulate the propagation of wireless signals in different environments, including the effect of IRS on the signal. This involves calculating the scattering, reflection, and diffraction of the wave.

Optimization of algorithm design: The algorithm is designed to dynamically adjust the reflection characteristics of the IRS unit to optimize the signal path. This may be accomplished by ML or other optimization technology.

Integration of environmental factors: Environmental factors (such as buildings and people) are integrated into the IRS reflection mechanism model, to ensure that signal propagation can be simulated in different scenarios.

(2) Establishment of the Digital Twin 3D Model

Creation of a digital twin 3D model of the physical world: 3D modeling software is used to create accurate digital copies of the environment, including buildings, terrain, and the like.

Integration of sensor data: Sensor data from the real world, if available, is integrated into the model to update and calibrate the model in real-time.

Simulation and analysis: Simulations are run in the digital twin 3D model to analyze the performance of the IRS and its impact on signal coverage.

(3) Fusion of the IRS Reflection Mechanism Model and the Digital Twin 3D Model

Integration of the IRS reflection mechanism model into the digital twin 3D model: The IRS reflection mechanism model is integrated into the digital twin 3D model. This means that any change in IRS will be reflected in the simulation of the digital twin model.

Dynamic data exchange: Real-time data exchange between the IRS reflection mechanism model and the digital twin 3D model is ensured; for example, the optimization results of the IRS model may be used to update the signal coverage simulations in the digital twin model.

Visualization and analysis: Influences of the IRS and communication performance under different conditions are analyzed and demonstrated using visualization tools of the digital twin 3D model.

Real-time updates and iterations: The digital twin 3D model is updated in real-time according to real-world changes and IRS performance data, to keep the digital twin 3D model up-to-date and accurate.

The generalized Snell Equation being used to simplify a complex system in the IRS reflection mechanism model includes:

(1) A signal is transmitted from a BS; since there is precise regulation and control of an IRS in a communication scenario, the BS therein is different from a conventional BS which transmits a sector electromagnetic wave, and the BS here transmits a plurality of beams of light.

Initialization parameters include radial widths of the beams of light, a position of the BS in a 3D geometric space, and the rotation amount of the BS in a 3D space, and specifically includes directions of the transmitted electromagnetic waves, central position of the IRS, the rotation amount of the IRS in the 3D space, the side lengths, thicknesses, and number of the IRS units, an overall size of an IRS plane, relative position of the IRS units and position thereof in space.

(2) A normal line of the IRS plane is solved.

(3) Ray detection is performed on the transmitted electromagnetic waves to determine whether the IRS is within the range.

It is detected that if the ray intersects the plane, as shown in Formula (1):

$$t = (P_0 - L_0) \cdot \frac{N}{L \cdot N}, \qquad (1)$$

where in Formula (1), $P_0$ is a point on a surface (plane) of an object to be detected, $L_0$ is a starting point of the ray, L is a direction of the ray (pointing from the start point to the end point), N is a normal line to the surface of the object, and "•" represents a dot product.

T is a scalar, if t is less than 0 or greater than 1, then the ray does not intersect the surface of the object; if t is between 0 and 1, then the ray intersects the surface of the object.

An intersection point P is calculated by Formula (2):

$$P = L_0 + t * L. \qquad (2)$$

(4) It is determined whether the ray is within the range of a plate, namely, whether a coverage range of the ray overlaps with a boundary of the plate, including:

According to the intersection point P and the radius of the ray, the coverage range of the ray on the Y-axis and Z-axis is obtained, and the minimum and maximum coverage coordinates of the ray on the Y-axis and Z-axis are set as $[Y_{min}, Y_{max}]$, and $[Z_{min}, Z_{max}]$, respectively. The boundaries of the plate in the Y-axis and Z-axis directions are $[-E/2, E/2]$ and $[-E/2, E/2]$, respectively, where E is the side length of the IRS plate. The overlap of the coverage range of the ray with the plate boundary can be determined by checking whether the two ranges intersect. Mathematically, this can be expressed by the following conditions:

In the Y-axis direction, the coverage range of ray intersects the boundary of the plate as follows:

$$Y_{min} \leq \frac{E}{2}, Y_{max} \geq -\frac{E}{2}$$

In the Z-axis direction, the coverage range of ray intersects the boundary of the plate as follows:

$$Z_{min} \leq \frac{E}{2}, Z_{max} \geq -\frac{E}{2}$$

If both the above conditions are met, that is, the coverage range of the ray in both the Y-axis and the Z-axis directions at least partly overlaps the boundary of the plate.

The position of the collision point relative to the IRS plate is calculated; the position of the collision point relative to the IRS plate can be represented by vector subtraction. Let the absolute position of the collision point in 3D space be a vector $\vec{C}$, and the absolute position of the center (or reference point) of the plate in 3D space be a vector $\vec{B}$, then the position of the collision point relative to the plate $\vec{R}$ is the difference between these two vectors, and the mathematical expression is as follows:

$$\vec{R} = \vec{C} - \vec{B}$$

(5) An index of an IRS unit where a light beam passes through reflection is found, and a phase parameter of the index is acquired.

After the position of the collision point relative to the IRS plate is obtained, the vector is expressed as $\vec{R} = (R_y, R_z)$; it is determined that which index are the values $R_y$ and $R_z$ on, that is, the IRS unit of which row and which column; the index of the IRS unit of an $i^{th}$ row and a $j^{th}$ column is set as (i, j); and the IRS plate is set to have A small plates transversely and longitudinally; and the range of the IRS unit relative to the IRS plate may be expressed as $$\left(i*E/A - \frac{E}{2}, j*E/A - \frac{E}{2}\right) \text{ to } \left((i+1)*E/A - \frac{E}{2}, (j+1)*E/A - \frac{E}{2}\right).$$

Then it is determined whether $(R_y, R_z)$ falls within the range, namely, determining:

$$i*E/A - \frac{E}{2} \le R_y, R_y \le (i+1)*E/A - \frac{E}{2}$$

$$j*\frac{E}{A} - \frac{E}{2} \le R_z, R_z \le (j+1)*E/A - \frac{E}{2}$$

(6) The generalized Snell Equation is used to calculate abnormal reflection to obtain angles of reflection ray $\theta_r$ and $\theta_i$, as shown in Formulas (3) and (4):

$$\sin(\theta_t)n_t - \sin(\theta_i)n_i = \frac{\lambda_o}{2}\frac{d\Phi}{dx}. \tag{3}$$

$$\theta_i = \arcsin\left(\sin(\theta_t) - \frac{\lambda_0}{2\pi ni}\left|\frac{d\Phi}{dx}\right|\right), \tag{4}$$

where in Formulas (3) and (4), $\theta_t$ is an incident angle, $n_t$ is an incident spatial dielectric constant, $\theta_i$ is a reflection angle, $n_i$ is a reflection spatial dielectric constant; in the process of reflection, generally, $n_t=n_i$ the incident space is the same as the reflection space; therefore $n_t=n_i$, $\lambda_o$ is wavelength, $d\Phi$ is phase mutation, and dx is reflection displacement difference caused by mutation.

(7) A reflection ray path is solved and a ray detection interface is set according to the angles and the collision point.

If the reflection point is P, the normal vector is $\vec{v}$, the reflection angle (the angle with the normal vector) is $\theta_i$, and the unit vector of the reference rotation is set to be $\vec{a}$, then the reflection ray can be expressed using a Rodrigues' rotation Formula as:

$$\vec{v}_{rot} = \vec{v}\cos\theta + (\vec{a}\times\vec{v})\sin\theta + \vec{a}(\vec{a}\cdot\vec{v})(1 - \cos\theta). \tag{60}$$

The deducing and optimizing the IRS communication system includes:

In the transmission process of a channel, the channel model is represented by a receiving end signal $y_k$, as shown in Formula (5): channel model is an important concept in communication systems, which is used to describe the characteristics of signal such as attenuation, diffusion, reflection, and refraction. It is the basis for the research and design of wireless communication systems and helps to understand and predict the propagation behavior of signals in different environments.

$$y_k = \left(h_{r,k}^H \Theta G + h_{d,k}^H\right)\sum_{j=1}^{K} w_j s_j + n_k, \tag{5}$$

where in Formula (5), $$k = 1, \dots, K, h_{r,k}^H$$

is an incident channel, $\Theta$ is a matrix composed of IRS phase parameters, G is a reflection channel, $$h_{d,k}^H$$

is a direct channel, $w_j$ is a $j^{th}$ beamforming parameter of a transmitting end, $s_j$ is a $j^{th}$ transmitting signal, K is the number of antennas at the transmitting end, and $n_k$ is noise; therefore, Formula (6) is obtained by a channel capacity Formula:

$$SINR_k = \frac{\left|\left(h_{r,k}^H \Theta G + h_{d,k}^H\right)w_k\right|^2}{\sum_{j\ne k}^{K}\left|\left(h_{r,k}^H \Theta G + h_{d,k}^H\right)w_j\right|^2 + \sigma_k^2}, \forall k, \tag{6}$$

where $SINR_k$ is a signal to interference plus noise ratio, $$\sigma_k^2$$

is a variance of the noise.

Therefore, in the optimization process, the minimum $SINR_k$ is maximized, that is, $\max\{\min(SINR_k)\}$, making resource allocation of the IRS communication system reach Pareto optimality.

The deducing and optimizing the IRS communication system is realized using DRL, including:

Based on the channel mechanism model, the optimization objective of the IRS communication system is obtained, and the variable parameters $\Theta$ of the system need to satisfy the constraints of the IRS mechanism model. Since both conditions have strong constraints, the final problem can be degenerated into a discrete optimization problem on variables $\Theta$. The following is a general procedure for solving an optimization problem using DRL:

(a) Definition of environment and state:

Environment is a problem that is trying to optimize, that is, $\max\{\min(SINR_k)\}$.

State is a current configuration of a matrix $\Theta$.

(b) Definition of action space:

The action is to modify certain elements in the matrix $\Theta$ to generate a new matrix configuration.

A reward function is defined, as the goal being $\max\{\min (SINR_k)\}$, the reward function is defined as Formula (7):

$$\text{Reward} = \min(SINR_k). \tag{7}$$

(c) Selection of a DRL algorithm, including, but not limited to, DQN, PPO, A3C, and the like.

(d) Training of a model: The model is trained using the selected DRL algorithm to learn what actions to take in each state to maximize rewards.

(e) Strategy execution: The model is used to determine an optimal action to take for a given matrix $\Theta$ after the training is complete.

(f) Evaluation and adjustment: Test data is used to evaluate performance of the optimization strategy and adjust as needed.

Preferably according to the present disclosure, the deducing and optimizing the IRS communication system is realized using a swarm intelligence algorithm (including but not limited to GA, PSO, ACO), including:

(g) Encoding of solutions: A matrix $\Theta$ is encoded to contain an array or list of all the elements.

(h) Definition of a fitness function: As the goal being max{min(SINR$_k$)}, the fitness function y is defined as Formula (8):

$$y = \min(SINR_k) \tag{8}$$

Trying to find solutions to maximize the fitness function includes:

initializing population:

randomly generating a set of initial $\Theta$.

Evaluation of initial population:

The fitness function y is used to evaluate quality of each solution;

Iterative optimization:

For each iteration, the solution is updated according to the selected swarm intelligence algorithm, including: crossover, mutation, and/or selection of the solutions (as in GA); updating the solution according to the performance of the neighbors (as in PSO). Solutions are updated based on previously found paths (as in ACO).

Termination conditions: The iteration is continued until the termination condition is satisfied, for example, a predetermined maximum number of iterations is reached; the improvement in fitness value is less than some threshold or other relevant criterion.

Return to an optimal solution: Return to a solution with an optimal fitness value.

The optimization strategy is fed back to the real world through a real-time communication mode.

The real-time data transmission is performed through real-time communication; the real-time communication mode includes mobile communication, satellite communication, a wireless local area network, wired communication, and Bluetooth; the real-time data transmission is performed through communication protocols including but not limited to Socket, HTTP/HTTPS, FTP, SMTP, MQTT, CoAP, XMPP, WebSockets, gRPC, RESTful APIs, AMQP, STOMP, RTP, TCP, UDP, Bluetooth, BLE, Zigbee, Z-Wave, LoRa, NFC, Modbus, Profibus, SOAP, and DDS. The optimization strategy is fed back to including but not limited to a single-chip microcomputer, a multi-channel relay, a programmable logic controller, and the like.

Embodiment 3

A digital twin-based deduction and optimization system for an IRS communication system includes:

a data collection module, configured to deploy enough sensors in a real scenario, and collect enough data from the scenario, including relevant data of an IRS physical model and real channel data;

a data transmission module, configured to perform real-time data transmission on the collected data and feed an optimization strategy back to the real world to realize the deduction and optimization of the IRS communication system;

a digital twin 3D model establishment module, configured to establish a digital twin 3D model in a digital twin space based on the data after the real-time data transmission;

an IRS reflection mechanism model establishment module, configured to establish an IRS reflection mechanism model before fusing with the digital twin 3D model, the generalized Snell Equation being used to simplify a complex system in the IRS reflection mechanism model; and a deduction-optimization module, configured to deduce and optimize the IRS communication system to obtain an optimization strategy.

What is claimed is:

1. A digital twin-based deduction and optimization method for an intelligent reflecting surface (IRS) communication system, comprising:

collecting data from a scenario, comprising relevant data of an IRS physical model and real channel data;

performing real-time data transmission on the collected data;

establishing a digital twin three-dimensional (3D) model in a digital twin space based on the data after the real-time data transmission;

establishing an IRS reflection mechanism model before fusing with the digital twin 3D model, the generalized Snell Equation being used to simplify a complex system in the IRS reflection mechanism model;

deducing and optimizing the IRS communication system to obtain an optimization strategy; and feeding the optimization strategy back to the real world to realize the deduction and optimization of the IRS communication system, wherein the relevant data of the IRS physical model and the real channel data comprise: electromagnetic waves; angles of the electromagnetic waves; a relative distance and position between a base station (BS), the IRS, and user equipment (UE); temperature and humidity; actual communication traffic or dynamic changes of the UE; phase and frequency changes of electromagnetic waves reflected by the IRS; energy or power of the electromagnetic waves transmitted by the BS and reflected by the IRS; an operating state of the IRS; ambient noise; delay, bandwidth, and data transmission rate of an actual network communication; 3D appearance images; and 3D point cloud data;

the establishing a digital twin 3D model in a digital twin space based on the data after the real-time data transmission, comprising:

performing static content modeling on background information with little change, while performing dynamic content modeling on user information with great change, modeling steps being as follows:

data cleaning: processing sensor data, namely, the acquired relevant data of the IRS physical model and real channel data;

3D modeling: creating geometry and appearance of the digital twin 3D model;

attribute assignment: assigning physical, chemical, or other relevant attributes to the digital twin 3D model; and model verification: comparing with real equipment or environment to ensure accuracy;

the establishing an IRS reflection mechanism model before fusing with the digital twin 3D model comprises:

(1) establishment of the IRS reflection mechanism model defining characteristics of IRS units;

simulating electromagnetic wave propagation;

optimization of algorithm design: dynamically adjusting reflection characteristics of the IRS units to optimize a signal path; and integration of environmental factors: integrating the environmental factors into the IRS reflection mechanism model;

(2) establishment of the digital twin 3D model creating a digital twin 3D model of the physical world;

integrating sensor data;

simulation and analysis: running simulations in the digital twin 3D model to analyze the performance of the IRS and its impact on signal coverage;

(3) fusion of the IRS reflection mechanism model and the digital twin 3D model integrating the IRS reflection mechanism model into the digital twin 3D model;

dynamic data exchange: ensuring real-time data exchange between the IRS reflection mechanism model and the digital twin 3D model;

visualization and analysis: analyzing and demonstrating influences of the IRS and communication performance under different conditions using visualization tools of the digital twin 3D model;

real-time updates and iterations: updating the digital twin 3D model in real-time according to real-world changes and IRS performance data, to keep the digital twin 3D model up-to-date and accurate;

the generalized Snell Equation being used to simplify a complex system in the IRS reflection mechanism model comprises:

(1) transmitting a signal from the BS, that is, transmitting a plurality of beams of light, wherein initialization parameters comprise radial widths of the beams of light, a position of the BS in a 3D geometric space, and the rotation amount of the BS in a 3D space, and specifically comprises directions of the transmitted electromagnetic waves, central position of the IRS, the rotation amount of the IRS in the 3D space, the side lengths, thicknesses, and number of the IRS units, an overall size of an IRS plane, relative position of the IRS units and position thereof in space;

(2) solving a normal line of the IRS plane;

(3) performing ray detection on the transmitted electromagnetic waves to determine whether the IRS is within the range;

detecting if the ray intersects the plane, as shown in Formula (1):

$$t = (P_0 - L_0) \cdot \frac{N}{L \cdot N}, \tag{1}$$

wherein in Formula (1), $P_0$ is a point on a surface of an object to be detected, $L_0$ is a starting point of the ray, L is a direction of the ray, N is a normal line to the surface of the object, and "•" represents a dot product, t is a scalar, if t is less than 0 or greater than 1, then the ray does not intersect the surface of the object; if t is between 0 and 1, then the ray intersects the surface of the object;

calculating an intersection point P by Formula (2):

$$P = L_0 + t*L; \tag{2}$$

(4) determining whether the ray is within the range of a plate, namely, whether a coverage range of the ray overlaps with a boundary of the plate;

calculating a position of a collision point relative to the IRS plate;

(5) finding an index of an IRS unit where a light beam passes through reflection, and acquiring a phase parameter of the index;

(6) using the generalized Snell Equation to calculate abnormal reflection to obtain angles of reflection ray $\theta_t$ and $\theta_i$, as shown in Formulas (3) and (4):

$$\sin(\theta_t) n_t - \sin(\theta_i) n_i = \frac{\lambda_o}{2\pi} \frac{d\Phi}{dx}, \tag{3}$$

$$\theta_i = \arcsin\left(\sin(\theta_t) - \frac{\lambda_0}{2\pi n_i}\left|\frac{d\Phi}{dx}\right|\right), \tag{4}$$

wherein in Formulas (3) and (4), $\theta_t$ is an incident angle, $n_t$ is an incident spatial dielectric constant, $\theta_i$ is a reflection angle, $n_i$ is a reflection spatial dielectric constant, $\lambda_o$ is wavelength, $d\Phi$ is phase mutation, and dx is reflection displacement difference caused by mutation;

(7) solving a reflection ray path, and setting a ray detection interface according to the angles and the collision point; and the deducing and optimizing the IRS communication system comprises:

a channel model being represented by a receiving end signal $y_k$ as shown in Formula (5) in the transmission process of a channel:

$$y_k = \left(h_{r,k}^H \Theta G + h_{d,k}^H\right) \sum_{j=1}^{K} w_j s_j + n_k, \tag{5}$$

wherein in Formula (5), $$k = 1, \ldots, K, h_{r,k}^H$$

is an incident channel, $\Theta$ is a matrix composed of IRS phase parameters, G is a reflection channel, $$h_{d,k}^H$$

is a direct channel, H is a conjugate transpose of a matrix operation, d is a direct distance between transmitter and receiver, $w_j$ is a $j^{th}$ beamforming parameter of a transmitting end, $s_j$ is a $j^{th}$ transmitting signal, K is the number of antennas at the transmitting end, and $n_k$ is noise; therefore, Formula (6) is obtained by a channel capacity Formula:

$$SINR_k = \frac{\left|\left(h_{r,k}^H \odot G + h_{d,k}^H\right)w_k\right|^2}{\sum_{j \neq k}^K \left|\left(h_{r,k}^H \odot G + h_{d,k}^H\right)w_j\right|^2 + \sigma_k^2}, \forall k, \tag{6}$$

wherein $SINR_k$ is a signal to interference plus noise ratio, $$\sigma_k^2$$

is a variance of the noise, wk is a power parameter of beamforming;

maximizing the minimum $SINR_k$, that is, max{min $(SINR_k)$}, making resource allocation of the IRS communication system reach Pareto optimality.

2. The digital twin-based deduction and optimization method for an IRS communication system according to claim 1, wherein the relevant data of the IRS physical model and the real channel data are acquired through various sensors, various sensors comprising an electromagnetic wave sensor, an angle sensor, a distance/position sensor, a temperature and humidity sensor, a dynamic load sensor, a phase and frequency sensor, an energy or power sensor, a state monitoring sensor, an ambient noise sensor, a network communication quality sensor, an image data sensor, and a point cloud data sensor, wherein the electromagnetic wave sensor is configured to capture the electromagnetic waves transmitted from the BS and the electromagnetic waves reflected by the IRS; the angle sensor is configured to measuring an angle of the electromagnetic wave incident on the IRS and an exit angle of the electromagnetic wave after reflection in real-time; the distance/position sensor is configured to measure the relative distance and position between the BS, the IRS, and the UE; the temperature and humidity sensor is configured to measure temperature and humidity; the dynamic load sensor is configured to monitor the actual communication traffic or the dynamic change of the UE; the phase and frequency sensor is configured to monitor phase and frequency changes of the electromagnetic waves reflected by the IRS; the energy or power sensor is configured to monitor the energy or power of the electromagnetic waves transmitted by the BS and reflected by the IRS; the state monitoring sensor is configured to monitor the operating state of the IRS; the ambient noise sensor is configured to capture ambient noise or interference; the network communication quality sensor is configured to monitor the delay, bandwidth, and data transmission rate of the actual network communication; the image data sensor is configured to collect 3D appearance images and match accurate positioning; and the point cloud data sensor is configured to collect 3D point cloud data.

3. The digital twin-based deduction and optimization method for an IRS communication system according to claim 1, wherein the relevant data of the IRS physical model and the real channel data are acquired through a real-time communication mode; the real-time communication mode comprises mobile communication, satellite communication, a wireless local area network, wired communication, and Bluetooth; the real-time data transmission is performed through communication protocols comprising but not limited to Socket, HTTP/HTTPS, file transfer protocol (FTP), simple mail transfer protocol (SMTP), message queuing telemetry transport (MQTT), constrained application protocol (CoAP), extensible messaging and presence protocol (XMPP), WebSockets, google remote procedure call (gRPC), RESTful application programming interfaces (APIs), advanced message queuing protocol (AMQP), streaming text orientated messaging protocol (STOMP), real-time transport protocol (RTP), transmission control protocol (TCP), user datagram protocol (UDP), Bluetooth, Bluetooth low energy (BLE), Zigbee, Z-Wave, low-rank adaptation (LoRa), near field communication (NFC), Modbus, Profibus, simple object access protocol (SOAP), and data distribution service (DDS).

4. The digital twin-based deduction and optimization method for an IRS communication system according to claim 1, wherein the deducing and optimizing the IRS communication system is realized using deep reinforcement learning (DRL), comprising:

(a) definition of environment and state:
environment being a problem that is trying to optimize, that is, max{min($SINR_k$)};
state being a current configuration of a matrix $\Theta$;
(b) definition of action space:
the action being to modify certain elements in the matrix $\Theta$ to generate a new matrix configuration;
defining a reward function: a reward function being defined as Formula (7):

$$Reward = \min(SINR_k); \tag{7}$$

(c) selection of a DRL algorithm;
(d) training of a model: training the model using the selected DRL algorithm to learn what actions to take in each state to maximize rewards;
(e) strategy execution: using the model to determine an optimal action to take for a given matrix $\Theta$ after the training is complete;
(f) evaluation and adjustment: using test data to evaluate performance of the optimization strategy and adjust as needed.

5. The digital twin-based deduction and optimization method for an IRS communication system according to claim 1, wherein the deducing and optimizing the IRS communication system is realized using a swarm intelligence algorithm comprises:

(g) encoding of solutions: encoding a matrix $\Theta$ to contain an array or list of all the elements;
(h) definition of a fitness function: the fitness function y being defined as Formula (8):

$$y = \min(SINR_k); \tag{8}$$

(i) trying to find solutions to maximize the fitness function, comprising:

initializing population:

randomly generating a set of initial Θ;

(j) evaluation of initial population:

using the fitness function y to evaluate quality of each solution;

(k) iterative optimization:

for each iteration, updating the solution according to the selected swarm intelligence algorithm, comprising: crossover, mutation, and/or selection of the solutions;

(l) termination conditions: continuing the iteration until the termination condition is satisfied; and (m) return to an optimal solution: returning to a solution with an optimal fitness value.

6. The digital twin-based deduction and optimization method for an IRS communication system according to claim 4, wherein the optimization strategy is fed back to the real world through a real-time communication mode.

7. A digital twin-based deduction and optimization system for an intelligent reflecting surface (IRS) communication system, comprising:

a data collection module, configured to collect data from a scenario, comprising relevant data of an IRS physical model and real channel data;

a data transmission module, configured to perform real-time data transmission on the collected data and feed an optimization strategy back to the real world to realize the deduction and optimization of the IRS communication system;

a digital twin three-dimensional (3D) model establishment module, configured to establish a digital twin 3D model in a digital twin space based on the data after the real-time data transmission;

an IRS reflection mechanism model establishment module, configured to establish an IRS reflection mechanism model before fusing with the digital twin 3D model, the generalized Snell Equation being used to simplify a complex system in the IRS reflection mechanism model; and a deduction-optimization module, configured to deduce and optimize the IRS communication system to obtain an optimization strategy, wherein the relevant data of the IRS physical model and the real channel data comprise: electromagnetic waves; angles of the electromagnetic waves; a relative distance and position between a base station (BS), the IRS, and user equipment (UE); temperature and humidity; actual communication traffic or dynamic changes of the UE; phase and frequency changes of electromagnetic waves reflected by the IRS; energy or power of the electromagnetic waves transmitted by the BS and reflected by the IRS; an operating state of the IRS; ambient noise; delay, bandwidth, and data transmission rate of an actual network communication; 3D appearance images; and 3D point cloud data;

the establishing a digital twin 3D model in a digital twin space based on the data after the real-time data transmission is divided into static content modeling and dynamic content modeling, comprising:

performing static content modeling on background information with little change, while performing dynamic content modeling on user information with great change, modeling steps being as follows:

data cleaning: processing sensor data, namely, the acquired relevant data of the IRS physical model and real channel data;

3D modeling: creating geometry and appearance of the digital twin 3D model;

attribute assignment: assigning physical, chemical, or other relevant attributes to the digital twin 3D model;

model verification: comparing with real equipment or environment to ensure accuracy;

the establishing an IRS reflection mechanism model before fusing with the digital twin 3D model comprises:

(1) establishment of the IRS reflection mechanism model defining characteristics of IRS units;

simulating electromagnetic wave propagation;

optimization of algorithm design: dynamically adjusting reflection characteristics of the IRS units to optimize a signal path; and integration of environmental factors: integrating the environmental factors into the IRS reflection mechanism model;

(2) establishment of the digital twin 3D model creating a digital twin 3D model of the physical world;

integrating sensor data;

simulation and analysis: running simulations in the digital twin 3D model to analyze the performance of the IRS and its impact on signal coverage;

(3) fusion of the IRS reflection mechanism model and the digital twin 3D model integrating the IRS reflection mechanism model into the digital twin 3D model;

dynamic data exchange: ensuring real-time data exchange between the IRS reflection mechanism model and the digital twin 3D model;

visualization and analysis: analyzing and demonstrating influences of the IRS and communication performance under different conditions using visualization tools of the digital twin 3D model;

real-time updates and iterations: updating the digital twin 3D model in real-time according to real-world changes and IRS performance data, to keep the digital twin 3D model up-to-date and accurate;

the generalized Snell Equation being used to simplify a complex system in the IRS reflection mechanism model comprises:

(1) transmitting a signal from the BS, that is, transmitting a plurality of beams of light, wherein initialization parameters comprise radial widths of the beams of light, a position of the BS in a 3D geometric space, and the rotation amount of the BS in a 3D space, and specifically comprises directions of the transmitted electromagnetic waves, central position of the IRS, the rotation amount of the IRS in the 3D space, the side lengths, thicknesses, and number of the IRS units, an overall size of an IRS plane, relative position of the IRS units and position thereof in space;

(2) solving a normal line of the IRS plane;

(3) performing ray detection on the transmitted electromagnetic waves to determine whether the IRS is within the range;

detecting if the ray intersects the plane, as shown in Formula (1):

$$t = (P_0 - L_0) \cdot \frac{N}{L \cdot N}, \tag{1}$$

wherein in Formula (1), $P_0$ is a point on a surface of an object to be detected, $L_0$ is a starting point of the ray, L is a direction of the ray, N is a normal line to the surface of the object, and "•" represents a dot product, t is a scalar, if t is less than 0 or greater than 1, then the ray does not intersect the surface of the object; if t is between 0 and 1, then the ray intersects the surface of the object;

calculating an intersection point P by Formula (2):

$$P = L_0 + t * L, \tag{2}$$

(4) determining whether the ray is within the range of a plate, namely, whether a coverage range of the ray overlaps with a boundary of the plate;

calculating a position of a collision point relative to the IRS plate;

(5) finding an index of an IRS unit where a light beam passes through reflection, and acquiring a phase parameter of the index;

(6) using the generalized Snell Equation to calculate abnormal reflection to obtain angles of reflection ray $\theta_t$ and $\theta_i$, as shown in Formulas (3) and (4):

$$\sin(\theta_t) n_t - \sin(\theta_i) n_i = \frac{\lambda_o}{2\pi} \frac{d\Phi}{dx}, \tag{3}$$

$$\theta_i = \arcsin\left(\sin(\theta_t) - \frac{\lambda_0}{2\pi n_i}\left|\frac{d\Phi}{dx}\right|\right), \tag{4}$$

wherein in Formulas (3) and (4), $\theta_t$ is an incident angle, $n_t$ is an incident spatial dielectric constant, $\theta_i$ is a reflection angle, $n_i$ is a reflection spatial dielectric constant, $\lambda_o$ is wavelength, $d\Phi$ is phase mutation, and dx is reflection displacement difference caused by mutation;

(7) solving a reflection ray path, and setting a ray detection interface according to the angles and the collision point; and the deducing and optimizing the IRS communication system comprises:

a channel model being represented by a receiving end signal $y_k$ as shown in Formula (5) in the transmission process of a channel:

$$y_k = \left(h_{r,k}^H \Theta G + h_{d,k}^H\right) \sum_{j=1}^{K} w_j s_j + n_k, \tag{5}$$

wherein in Formula (5), $$k = 1, \dots, K, h_{r,k}^H$$

is an incident channel, $\Theta$ is a matrix composed of IRS phase parameters, G is a reflection channel, $$h_{d,k}^H$$

is a direct channel, $w_j$ is a $j^{th}$ beamforming parameter of a transmitting end, $s_j$ is a $j^{th}$ transmitting signal, K is the number of antennas at the transmitting end, and $n_k$ is noise; therefore, Formula (6) is obtained by a channel capacity Formula:

$$SINR_k = \frac{\left|\left(h_{r,k}^H \Theta G + h_{d,k}^H\right) w_k\right|^2}{\sum_{j\neq k}^{K}\left|\left(h_{r,k}^H \Theta G + h_{d,k}^H\right) w_j\right|^2 + \sigma_k^2}, \forall k, \tag{6}$$

wherein $SINR_k$ is a signal to interference plus noise ratio, $$\sigma_k^2$$

is a variance of the noise;

maximizing the minimum $SINR_k$, that is, max{min $(SINR_k)$}, making resource allocation of the IRS communication system reach Pareto optimality.

* * * * *